(12) United States Patent
Irvine et al.

(10) Patent No.: US 11,135,578 B2
(45) Date of Patent: Oct. 5, 2021

(54) SPINEL SUPPORTED METAL CATALYST FOR STEAM REFORMING

(71) Applicant: UNIVERSITY COURT OF THE UNIVERSITY OF ST ANDREWS, Fife (GB)

(72) Inventors: John T. S. Irvine, Fife (GB); Elena Stefan, Enschede (NL); Dragos Neagu, Gateshead (GB); Ahmed Umar, Fife (GB)

(73) Assignee: UNIVERSITY COURT OF THE UNIVERSITY OF ST ANDREWS, St Andrews (GB)

( * ) Notice: Subject to any disclaimer, the term of this patent is extended or adjusted under 35 U.S.C. 154(b) by 34 days.

(21) Appl. No.: 16/346,997

(22) PCT Filed: Nov. 3, 2017

(86) PCT No.: PCT/GB2017/053318
§ 371 (c)(1),
(2) Date: May 2, 2019

(87) PCT Pub. No.: WO2018/083488
PCT Pub. Date: May 11, 2018

(65) Prior Publication Data
US 2020/0070139 A1 Mar. 5, 2020

(30) Foreign Application Priority Data
Nov. 3, 2016 (GB) ...................... 1618544

(51) Int. Cl.
*B01J 23/00* (2006.01)
*B01J 23/88* (2006.01)
(Continued)

(52) U.S. Cl.
CPC ............. *B01J 37/18* (2013.01); *B01J 23/005* (2013.01); *B01J 23/8892* (2013.01);
(Continued)

(58) Field of Classification Search
CPC ...... B01J 23/005; B01J 23/8892; B01J 37/08; B01J 37/18; B01J 35/006; B01J 35/1009; B01B 3/40
See application file for complete search history.

(56) References Cited

U.S. PATENT DOCUMENTS 4,220,560 A    9/1980   Anquetil et al.
9,211,528 B2 * 12/2015  Hall ...................... B01J 35/006
(Continued)

FOREIGN PATENT DOCUMENTS

GB    2010114 A      6/1979
WO    2008049266 A1  5/2008
WO    2013007993 A2  1/2013

OTHER PUBLICATIONS

Stefan, E., et al.; "Synthesis and characterization of chromium spinels as potential electrode support materials for intermediate temperature solid oxide fuel cells," Journal of Materials Science, 2011, pp. 7191-7197, vol. 46.
(Continued)

*Primary Examiner* — Cam N. Nguyen
(74) *Attorney, Agent, or Firm* — Christopher J. Knors; Moore & Van Allen PLLC

(57) ABSTRACT

The invention relates to a catalyst useful in the steam reforming of hydrocarbons and oxygenated hydrocarbons. The invention provides a method for preparing a catalyst comprising heating a spinel of formula $ANi_xFe_{(1-x)}CrO_4$ where A is Mn or Mg and x is from 0 to 0.75 under reducing conditions at a temperature of from 800 to 1500° C., and catalysts obtainable by said method.

8 Claims, 10 Drawing Sheets

(51) Int. Cl.
    *B01J 37/08*     (2006.01)
    *B01J 37/18*     (2006.01)
    *B01J 35/00*     (2006.01)
    *B01J 35/10*     (2006.01)
    *C01B 3/40*     (2006.01)
    *B01J 23/889*     (2006.01)

(52) U.S. Cl.
CPC ......... *B01J 35/006* (2013.01); *B01J 35/1009* (2013.01); *B01J 37/08* (2013.01); *C01B 3/40* (2013.01); *C01B 2203/0233* (2013.01); *C01B 2203/1082* (2013.01); *C01B 2203/1217* (2013.01)

(56) References Cited

U.S. PATENT DOCUMENTS

2013/0172179 A1* 7/2013 Hall .................. B01J 23/8892
                                                       502/328
2014/0243193 A1   8/2014 Hall

OTHER PUBLICATIONS

Stefan, Elena, et al.; "Structure and properties of MgMxCr2-xO4 (M=Li, Mg, Ti, Fe, Cu, Ga) spinels for electrode supports in solid oxide fuel cells," Journal of Materials Chemistry A, 2014, pp. 18106-18114, vol. 2.

Dieuzeide, M.L, et al.; "Steam reforming of glycerol over Ni/Mg/ y-A2O3 catalysts, Effect of calcination temperatures," International Journal of Hydrogen Energy, 2012, pp. 14926-14930, vol. 37.

EPO; International Search Report and Written Opinion for International Application No. PCT/GB2017/053318 dated Jan. 5, 2018, 15 Pages.

UKIPO; Search Report for GB Application No. 1618544.9 dated May 9, 2017, 4 Pages.

EPO; Written Opinion for International Application No. PCT/ GB2017/053318 dated Oct. 5, 2018, 5 Pages.

EPO; International Preliminary Report on Patentability for International Application No. PCT/GB2017/053318 dated Jan. 15, 2019, 9 Pages.

* cited by examiner

US 11,135,578 B2

SPINEL SUPPORTED METAL CATALYST FOR STEAM REFORMING

CROSS-REFERENCE TO RELATED APPLICATIONS

This application is a 35 U.S.C. § 371 National Stage Application of International Application No. PCT/GB2017/053318, filed Nov. 3, 2017, which claims the benefit of GB Application No. 1618544.9 filed on Nov. 3, 2016, the entirety of each of which is incorporated herein by reference.

FIELD OF THE INVENTION

The invention relates to a catalyst for the steam reforming of hydrocarbons and oxygenated hydrocarbons. The catalyst comprises Fe/Ni supported on a porous spinel lattice. In particular, the invention relates to a method for preparing said catalyst and a method of steam reforming hydrocarbons or oxygenated hydrocarbons using said catalyst.

BACKGROUND OF THE INVENTION

The steam reforming of natural gas (methane) is the most common method of producing commercial bulk hydrogen. There is interest in producing hydrogen from methane and other hydrocarbons for use in fuel cells. Also, there is increasing interest in reforming biomass to hydrogen-rich gases to replace the conventional fast-depleting fossil-based hydrogen for the utilization of solid oxide fuel cell, for example. In particular, steam reforming of glycerol has been receiving increased attention. Currently, glycerol is an under-used by product of biodiesel synthesis. Efficient and effective conversion of glycerol to high value-added products such as $H_2$-rich gas is very desirable as it would close the biodiesel processing loop. Although steam reforming is generally considered efficient, the use of glycerol feed (and other large hydrocarbons) leads to so many reactions that could result in low conversion, coke deposition and possible catalyst deactivation, especially using commercial Ni-based supported catalysts. There is a need for new catalysts for the steam reforming of glycerol which address at least one or more of these problems. Indeed, there is a need for new catalysts useful in the steam reforming of hydrocarbons.

Many industrial catalysts consist of spinel-supported metal particles (e.g. catalysts used for soot removal, NOx storage-reduction, dry reforming of methane, synthesis of hydrocarbons). Such oxide-supported metal catalysts are typically prepared through deposition techniques such as chemical infiltration. In this approach, the catalyst precursor is infiltrated onto the surface of the oxide support and a subsequent thermal treatment typically converts it into the corresponding oxide. The sample is then reduced to produce the metal catalyst particles. Infiltration can be a very flexible method for producing a wide range of catalyst-decorated oxides. However, it can be very time-consuming, because finding adequate wetting parameters can be challenging and once that is achieved, typically several infiltration steps are still required to reach the desired particle loading. Infiltration is also potentially expensive given the availability of some catalyst precursors, such as noble or otherwise rare metal precursors, and additionally wasteful because typically not all of the precursor formulation reaches or remains attached to the intended surfaces (especially relevant for the infiltration of precious metals). Most importantly, however, particles prepared through infiltration are generally known to develop a rather weak interaction with the oxide support and thus are prone to thermal agglomeration over time. There is a need for an alternative method for preparing oxide-supported metal catalysts. There is a need for a method for preparing oxide-supported metal catalysts that solves at least some of the afore-mentioned problems. In particular these needs relate to spinel-supported metal catalysts. Further, the particle size, morphology and interaction of metal particles with their oxide support in metal-oxide supported catalysts are known to impact the activity, selectivity and stability of the catalysts. It would be desirable to be able to design and control the characteristics of the metal particles supported on oxides and the overall morphology of these complex systems. Thus there is a need for a new way to design smarter, more efficient oxide-supported metal catalyst systems, in particular spinel-supported metal catalysts.

SUMMARY OF THE INVENTION

In a first aspect, the invention provides a method for preparing a catalyst comprising heating a spinel of formula $ANi_xFe_{(1-x)}CrO_4$ where A is Mn or Mg and x is from 0 to 0.75 under reducing conditions at a temperature of from 800 to 1500° C.

It has been found that upon such thermal reduction, the spinel undergoes a reorganisation or restructuring; metal segregates from the spinel lattice leaving a porous residual spinel lattice supporting particles of the segregated metal. Advantageously, the resultant restructured spinel exhibits good catalytic functionality when used in the steam reforming of glycerol. Further, it is believed that the catalytic metal particles are strongly bound to the support, rendering this a stable catalytic system. Further, this reorganisation of the spinel can be readily controlled. The method of the invention can be tailored so that the metal particle size, metal particle dispersion and the porosity of resultant catalyst can be varied. This ability to control the particle size, morphology and interaction of metal particles on a metal oxide support means that this method is capable of producing very effective catalysts.

In a second aspect, the invention provides a catalyst obtained or obtainable by the method of the first aspect of the invention. Thus the invention provides for a catalyst of formula $ANi_xFe_{(1-x)}CrO_4$ where A is Mn or Mg, and x=0 to 0.75, wherein said catalyst comprises a porous spinel phase supporting metal particles of Ni, Fe, mixtures thereof, and/or alloys thereof. In one embodiment, the porous spinel phase has the structure of a spinel of formula $ACr_2O_4$, where A is as Mn or Mg.

In a third aspect, the invention provides a method of steam reforming a hydrocarbon or an oxygenated hydrocarbon comprising contacting said hydrocarbon or oxygenated hydrocarbon with steam and the catalyst of the invention under steam reforming conditions. In particular, when used in glycerol steam reforming, catalysts prepared by the method of the invention have been found to exhibit improved coking resistance, catalytic activity and conversion when compared to a Ni/γ-alumina catalyst.

BRIEF DESCRIPTION OF THE DRAWINGS

FIG. 2(a) is the SEM mage of the precursor spinel $MnFeCrO_4$ which has been sintered in air at 1400° C. for 12 hours. Precursor spinel $MnFeCrO_4$ is used to make the catalysts of Examples 1, 2, 6 and 7. This electron micrograph was recorded in backscattering mode.

FIGS. 2(b) and (c) are SEM images of the catalysts of Examples 1 and 2, respectively. These electron micrographs were recorded in backscattering mode.

FIG. 2(d) contains three bright-field TEM images showing cross sections of the channels present in the catalyst of Example 2.

FIG. 2 (f) is an SEM image of the catalyst of Example 5 following etching in $HNO_3$ to dissolve the metal particles, exposing the sockets in which they were fixed. This electron micrograph was recorded in backscattering mode.

FIG. 6(b) is a graph of weight change of the catalyst of Examples 10 to 13 in oxidising atmosphere monitored in parallel with the released $CO_2$ as a function of temperature.

DETAILED DESCRIPTION OF THE INVENTION

Figure 1:
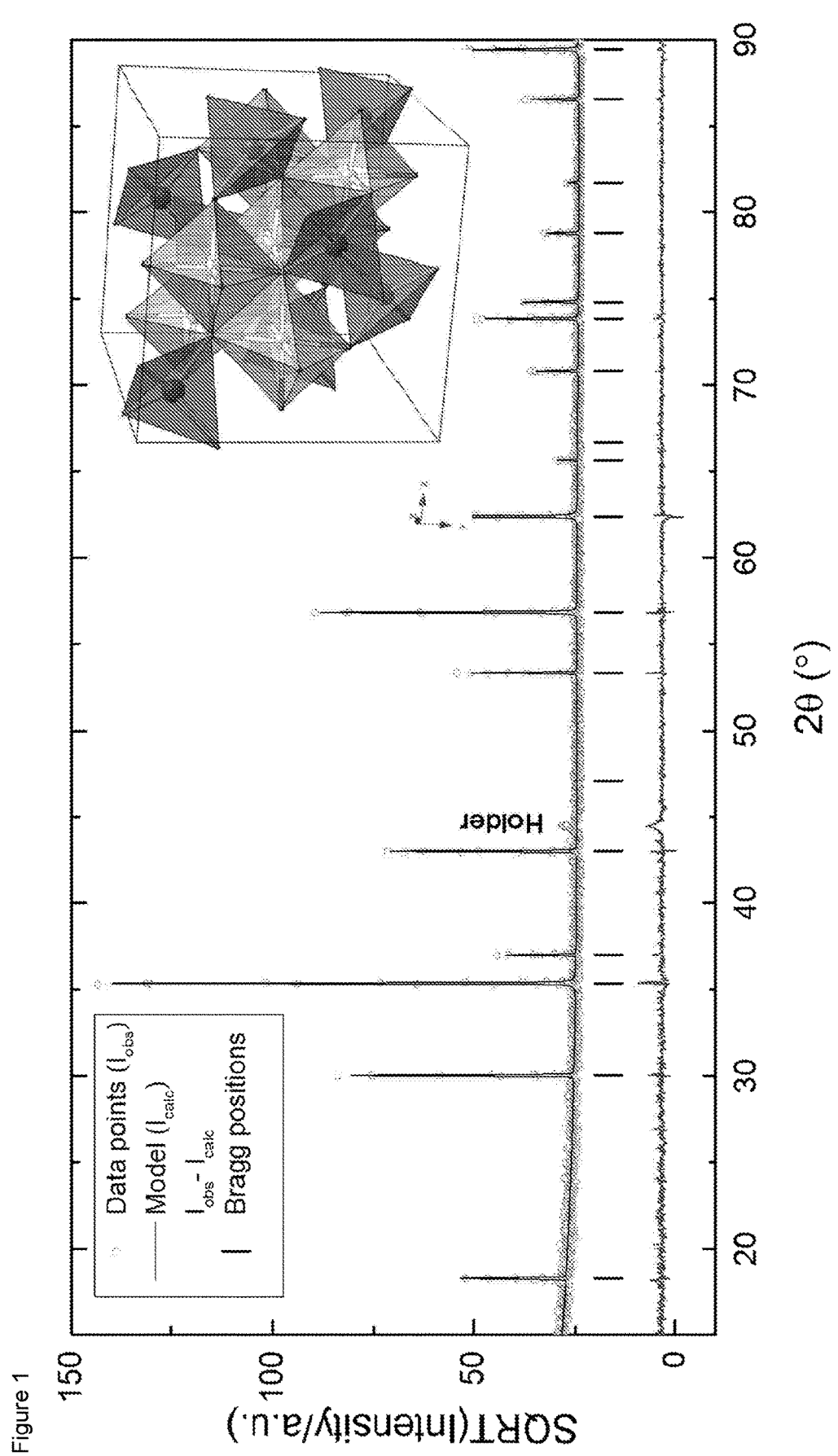
FIG. 1 is the Rietveld refinement of the precursor spinel $MnNi_{0.5}Fe_{0.5}CrO_4$ sintered in air at 1400° C. for 12 hours. The spinel crystal structure is included as an inset.

In a first aspect, the invention provides a method for preparing a catalyst comprising heating a spinel of formula $ANi_xFe_{(1-x)}CrO_4$ where A is Mn or Mg and x is from 0 to 0.75 under reducing conditions at a temperature of from 800 to 1500° C.

Precursor Spinel

The spinel of formula $ANi_xFe_{(1-x)}CrO_4$ where A is Mn or Mg and x is from 0 to 0.75 used in the method of the invention is also referred to herein as the precursor spinel or oxidised spinel.

In one embodiment, the precursor spinel has a formula of $ANi_xFe_{(1-x)}CrO_4$ where A is Mn or Mg and x is from 0 to 0.75 and wherein x>0, i.e. Ni is present. For example x can be 0.1 or greater, or x can be 0.2 or greater. For example, x can be up to 0.5, 0.55, 0.6 or 0.7. In one embodiment, A is Mn. In one embodiment, A is Mg.

As referred to herein, spinel refers to a member of the family of spinel compounds represented by the general formula $AB_2O_4$ where A and B are mainly divalent and trivalent cations, respectively. A cubic close-packed (ccp) lattice is formed by 32 oxygen ions, which forms 64 tetrahedral holes and 32 octahedral holes in one unit cell. In a spinel, one half of the octahedral sites are occupied by B ions, and one eighth of the tetrahedral sites are occupied by A ions. A large group of 3d-transition metal oxides crystallise in the spinel structure. As referred to herein, a spinel has a cubic close-packed structure and is classified in space group Fd-3m (H.S.C. O'Neill and A. Navrotsky, Am. Mineral, 1983, 68, 81-194).

The precursor spinel can be prepared by means known in the art, for example, by citric acid-nitrate combustion synthesis in air. This method involves forming an aqueous solution of stoichiometric amounts of the relevant metal nitrates and citric acid; heating the solution to 300° C. and maintaining it at this temperature until the solution is converted to powder product, e.g. when only powder product remains; calcining the powder product at a temperature of about 600° C. or above for a period of time; optionally forming pellets of the calcined powder; and sintering the calcined powder (optionally in pellet form) in air at temperatures of about 800° C. or above for a period of time.

The aqueous solution referred to above comprises metal nitrates, citric acid and water. The metal nitrates can be chosen from $Mn(NO_3)_2.4H_2O$, $Cr(NO_3)_3.9H_2O$, $Fe(NO_3)_3.9H_2O$, $Mg(NO_3)_2.6H_2O$ and $Ni(NO_3)_2.6H_2O$. An excess of citric acid, for example citric acid:spinel in a 1:2 molar ratio, can be used for the certainty of a complete reaction. Preferably the water is distilled water. Preferably, during heating, the aqueous solution is continually stirred. The purpose of the calcination of the resultant powder is to ensure complete removal of organic compounds and decomposition of nitrates. Calcination can be carried out at a temperature in the range of 600° C. to 1200° C., preferably 700 to 1000° C. Calcination can be carried out at this temperature, for example, for about 8 to 12, preferably 10 hours. The purpose of the sintering is to finalize formation of the spinel as a ceramic material. The sintering in air can be carried out at a temperature in the range of 900° C. to 1500° C., preferably 1000 to 1400° C. The sintering can be carried out at this temperature, for example, for about 8 to 12, preferably 10 hours. The calcined powders may be formed into pellets, e.g. by pressing, prior to sintering. Pore-former, for example, graphite flakes (Alfa Aesar) can be added to the spinel powder before pelleting to control the resultant relative density of the pellets. The porosity and grain size of the spinel precursors can be controlled by varying the calcination temperatures, the use of pore formers and by varying the sintering temperatures.

The precursor spinels can be characterised by X-ray diffraction techniques which are described in the examples section. The precursor spinels display the characteristic cubic Fd-3m (No. 227) crystal structure and this can be confirmed by Rietveld refinement. An example of this analysis together with the corresponding structure is given for the $MnNi_{0.5}Fe_{0.5}CrO_4$ precursor spinel which was sintered at 1400° C. for 12 hours in air in FIG. 1.

Figure 2:
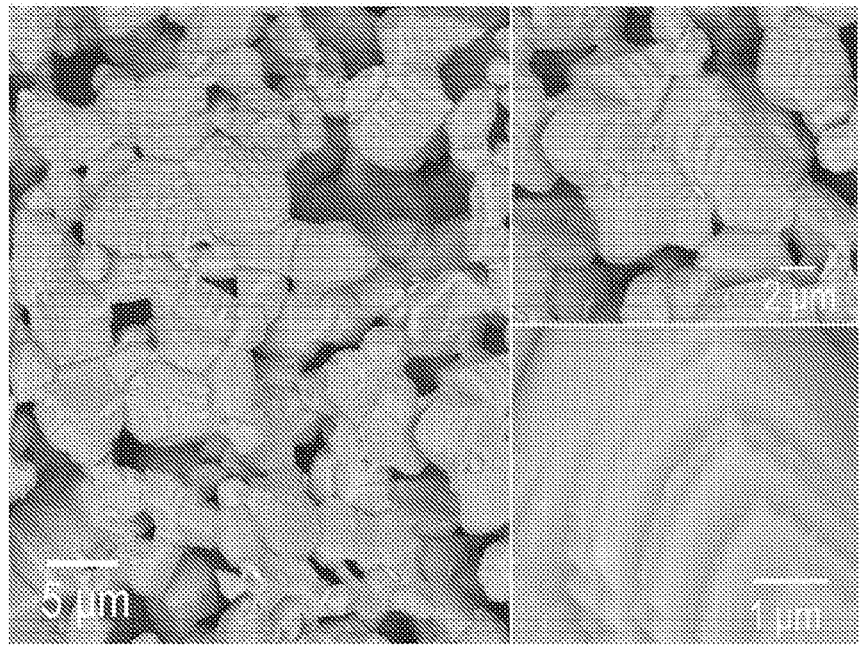
FIG. 2 (e) is a plot of cell parameters of key spinel phases before (precursor spinel) and after (catalyst of the invention) reduction of the precursor spinels used to produce the catalysts of Examples 2, 3 and 4, and the spinel of Reference Example 1.
Figure 2:
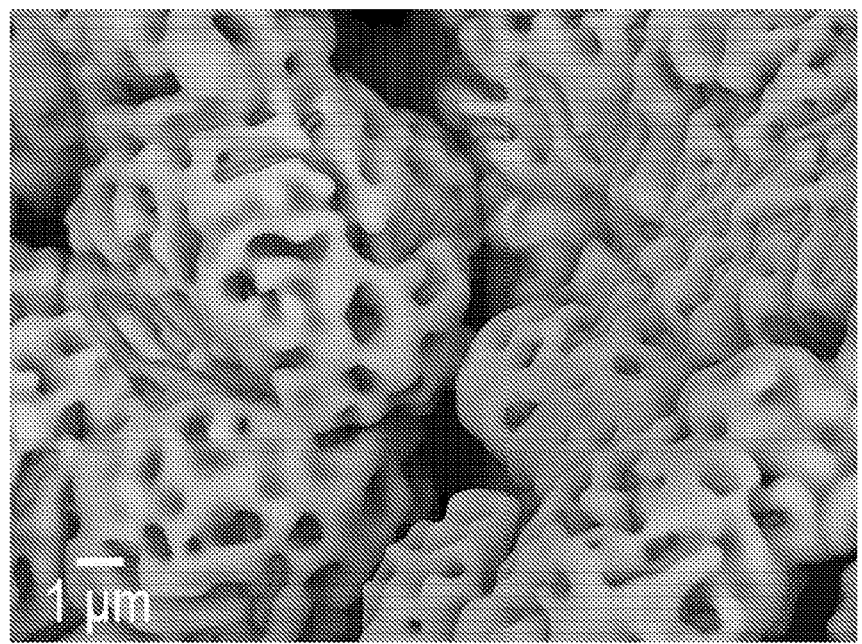
Figure 2:
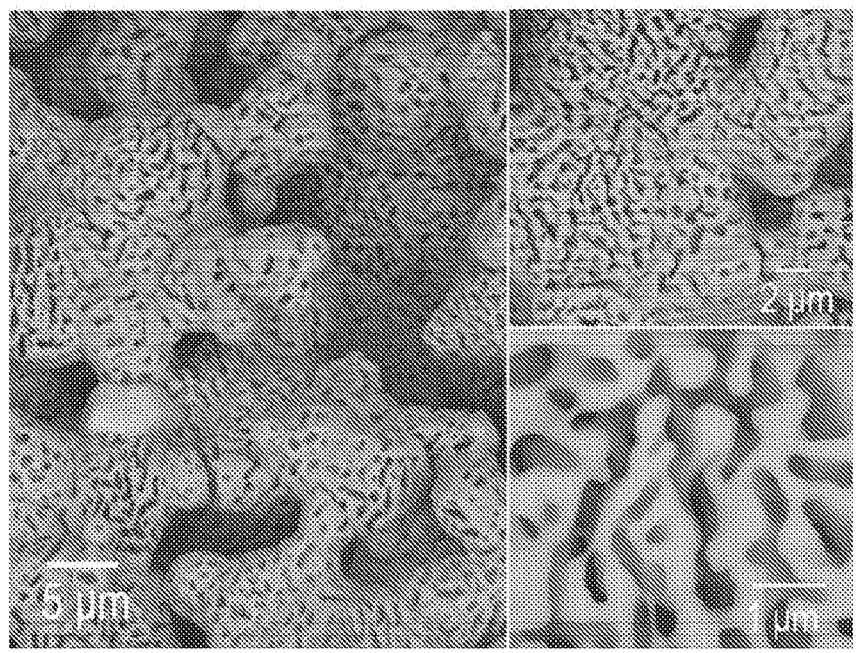
Figure 2:
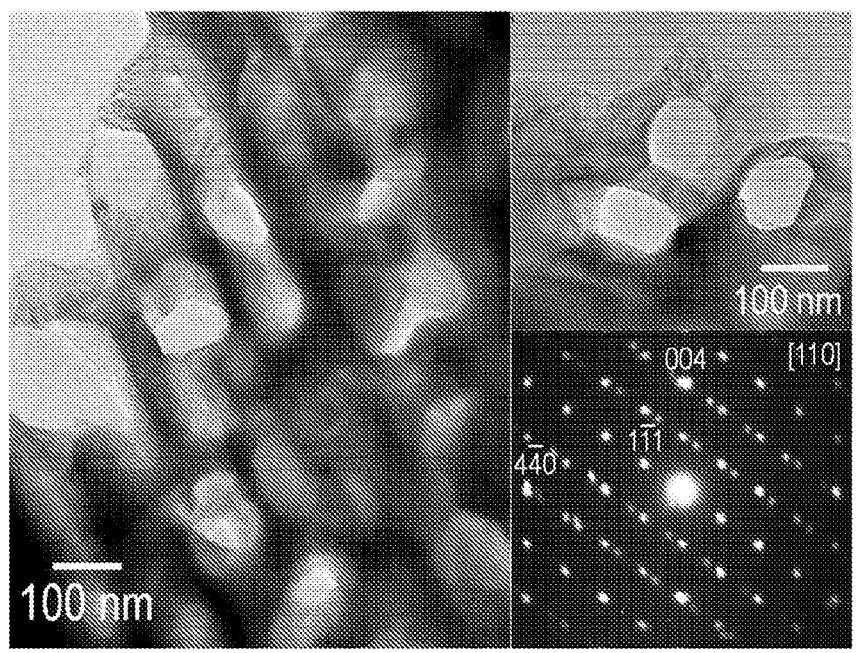
Figure 2:
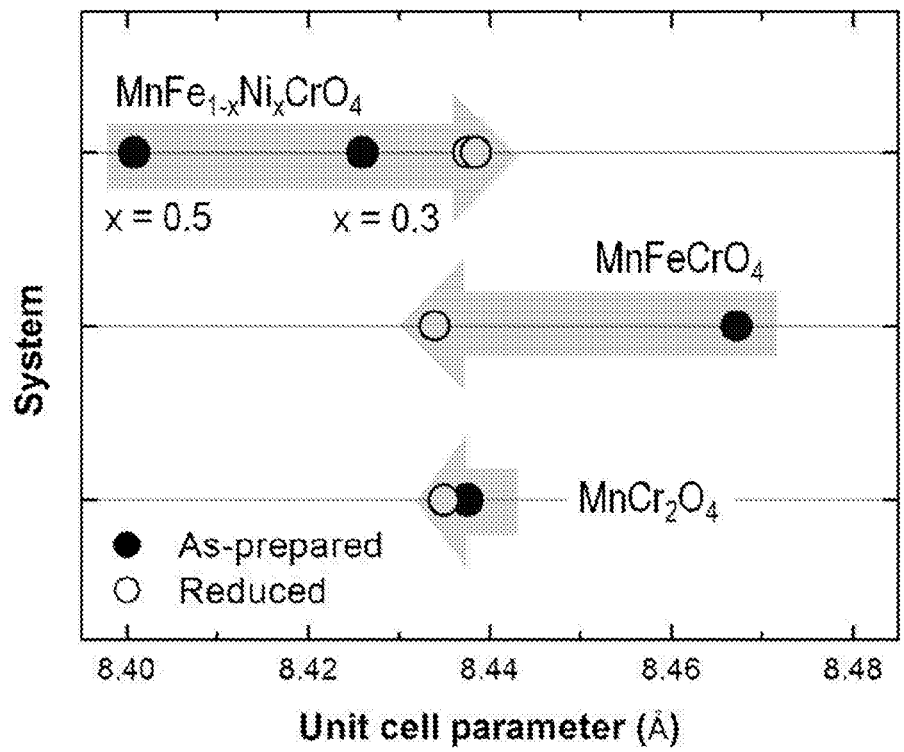
Figure 2:
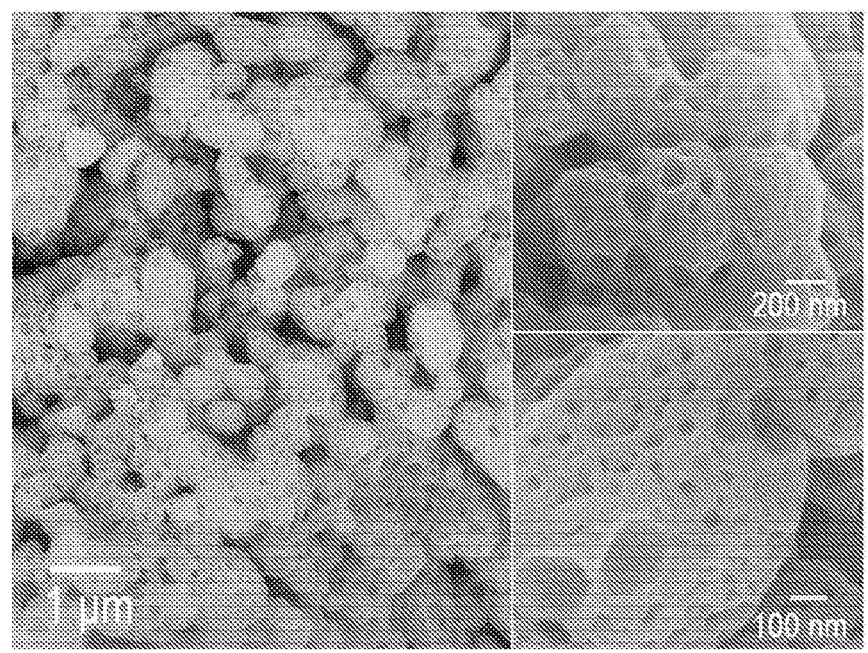

The precursor spinels can be characterised using SEM (scanning electron microscopy) techniques. Preferably, the spinel precursors in powder and in pellet form comprise grains having a diameter (or longest dimension) of from 1 to 30 μm. FIG. 2(a) is the SEM mage of the precursor spinel $MnFeCrO_4$ which has been sintered in air at 1400° C. for 12 hours. The micron scale grains of the precursor spinel are clearly shown in this image. Preferably, the precursor spinel pellets display a porosity (i.e. the fraction of the volume of voids over the total volume) from 0.1 to 0.5.

Preferably, the precursor spinels used in the present invention contain no metal oxides other that the spinel. Preferably the precursor spinels are pure phase, i.e. only a single spinel phase is present and, for example, no other metal oxides are present. In one embodiment, when A is Mn and x is greater than 0, x is no greater than 0.55 in the formula $ANi_xFe_{(1-x)}CrO_4$ for the precursor spinel. In this embodiment, x can be from 0.1 to 0.55 or 0.2 to 0.55. In this embodiment, the precursor spinel can be considered to be single phase as the nickel, in the form of nickel oxide, is considered to be fully solubilised in the spinel lattice.

Reduction of the Precursor Spinel

The method of the invention comprises heating the precursor spinel under reducing conditions at a temperature of from 800 to 1500° C. The temperature can be from 900 to 1200 or 1300° C. These are relatively severe conditions and are chosen so as to cause a restructuring or reorganisation of the precursor spinel to form the catalyst of the invention.

In particular, the reducing (i.e. heating) step causes metal to be exsolved from the precursor spinel and to form particles on the surface of the residual spinel lattice (also referred to herein as the residual grains of the precursor spinel). Preferably the reducing step causes Ni and/or Fe to be exsolved from the precursor spinel. Preferably, the reducing step causes metal particles of Ni, Fe, mixtures and/or alloys thereof to be formed. The metal particles can be described as being dispersed on the grains of the residual spinel lattice.

Reducing conditions are those known in the art and include in the presence of hydrogen gas, in the presence of CO or in a vacuum. The precursor spinel can be heated in a vacuum, for example less than $5 \times 10^{-2}$ mbar or from 2 to $5 \times 10^{-2}$ mbar or heated in the presence of hydrogen in an inert carrier gas, for example in the presence of 0.1-0.2 bar 5% $H_2$/Ar. Preferably, the hydrogen is dry, i.e. it is not humidified. The heating under reducing conditions is carried out at the specified temperature and for the length of time required to achieve the desired restructuring of the precursor spinel. In one embodiment, heating is carried out at a temperature of from 850 to 1250° C. or 900 to 1200° C. The heating can be carried out, for example, for 1 to 3 hours or more.

In addition, during the reduction process, pores are formed in the precursor spinel structure. They can be observed in the residual grains of the precursor spinel and, in some embodiments, the pores develop into intricate nano-channels.

In one embodiment, the method of the invention produces a catalyst which comprises a porous spinel phase supporting metal particles of Ni, Fe, and/or of mixtures and/or alloys thereof. The porous spinel phase is the residual spinel lattice resulting from the thermal reduction of the precursor spinel. The catalyst has a formula $ANi_xFe_{(1-x)}CrO_4$ where A is Mn or Mg, and x=0 to 0.75, i.e. the same formula as the precursor spinel.

Typically, the method of the invention produces a catalyst comprising residual grains of the precursor spinel (or a spinel phase comprising grains) having a longest dimension or diameter of from 1 to 30 μm. Typically, the grains comprise pores having a longest dimension or diameter of from 10 nm to 1 μm.

Typically, the method of the invention produces a catalyst comprising metal particles having a longest dimension or diameter of from 10 nm to 5 μm. In one embodiment all of the Ni and/or Fe present in the precursor spinel is exsolved from the precursor spinel and forms metal particles on the surface of the residual spinel lattice. In one embodiment the metal particles are present in an amount of up to 20 wt % of the catalyst, preferably they are present in an amount to from 1 or 2 wt % to 15 or 18 wt % of the catalyst.

Preferably the resultant catalyst has a BET surface area ranging from 1.2 to 5.3 $m^2\ g^{-1}$.

The microstructural changes brought about by reduction are illustrated in the SEM images of FIGS. 2(a) and (c), in which the microstructure of $MnFeCrO_4$ is shown at different scales, before (in the form of the precursor spinel) and after reduction (in the form of the catalyst of the invention as prepared in Example 7), respectively. It can be seen that, upon reduction, the $MnFeCrO_4$ precursor spinel undergoes a substantial restructuring, forming intricate interconnected porosity within the residual micron-scale parent grain assemblages and forming micron-size Fe particles. Despite the extent of these changes the spinel grains retain their overall initial microstructural configuration, in particular the shape and connectivity. To better understand the transformations that the oxidised microstructure (i.e. the structure of the $MnFeCrO_4$ precursor spinel) undergoes upon reduction, a sample was reduced briefly and then quenched to 'freeze' the high temperature microstructure and thus record a snapshot micrograph of the reorganisation process (Example 1). The result is presented in FIG. 2(b) and illustrates the metal phase 'streaming out' of the parent spinel grains, thus giving rise to the channels. It should be noted here that the non-random, yet non-symmetric morphology of the channel network that forms during and following metal segregation is very similar to the interfacial patterns described by the Cahn-Hilliard equation governing spinodal decomposition processes observed in certain alloy, polymer or colloidal systems. Interestingly, TEM and electron diffraction data of the grains following restructuring (FIG. 2(d), catalyst of Example 7) indicate that in spite of the considerable scale on which the phase separation illustrated in FIG. 2(b) occurs, the crystallinity displayed by the initial grains seems to be preserved in the residual grains also. It is unusual to see such porous crystals that have been equilibrated at such high temperatures, and it is believed that the result is a catalyst with a robust and well connected structure.

Figure 3:
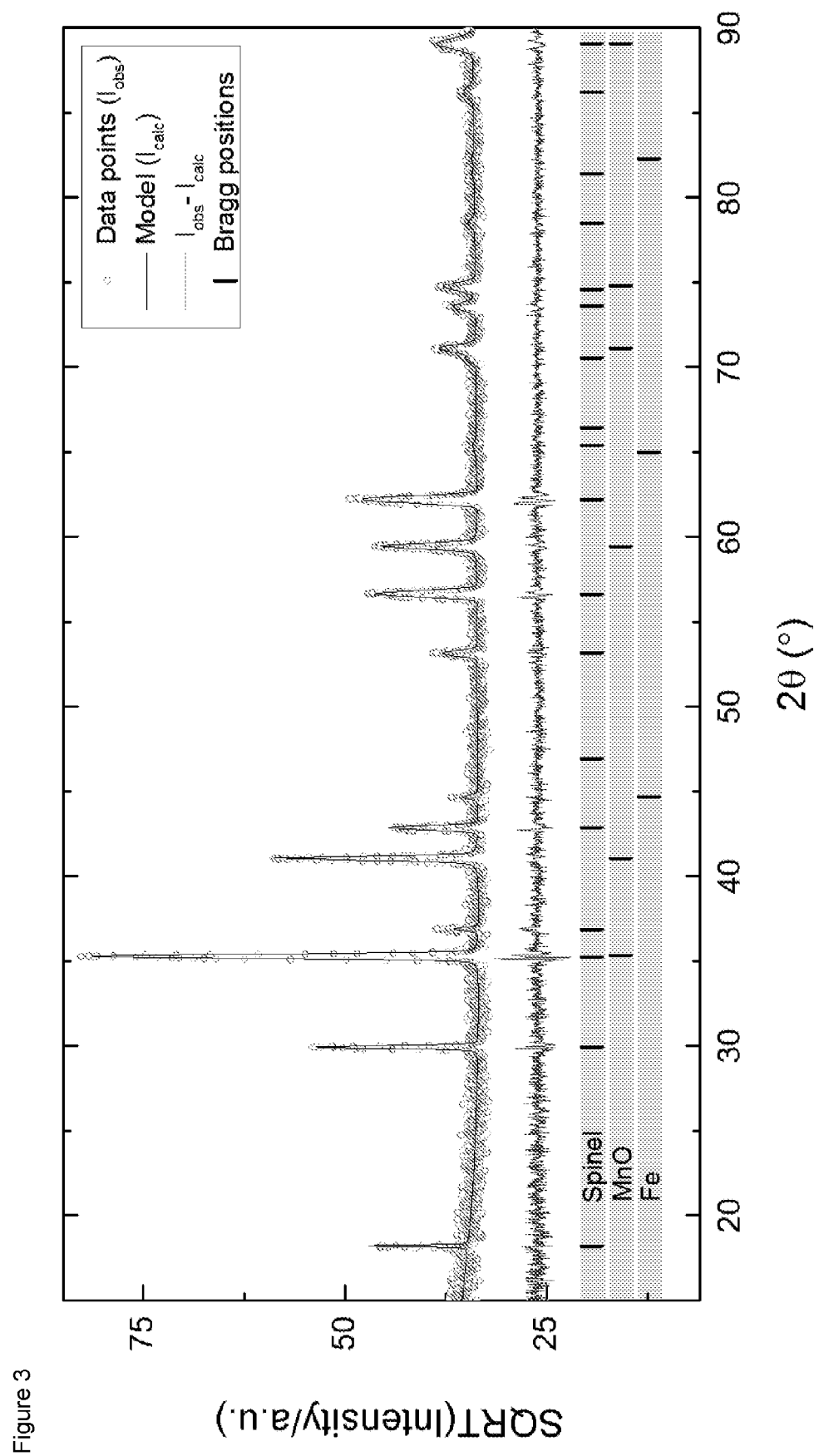
FIG. 3 is a Rietveld refinement of the catalyst of Example 2. The refinement plot has observed data represented as grey dots, calculated profile with black line and difference profile with dark grey line. Corresponding Bragg positions are indicated for each of the identified and refined phases. $R_p$=2.40%, $R_{wp}$=3.18%, $R_{exp}$=3.00%, $X^2$=1.12.

Rietveld analysis of the XRD pattern of the end microstructure (FIG. 2(c)) revealed that the catalyst of Example 2 consists of a spinel phase, a MnO phase and metallic Fe (FIG. 3). The parameters resulting from refinement of the XRD pattern for the catalyst of Example 2 are shown in the table below.

| Parameter | Spinel matrix | MnO | Fe |
|---|---|---|---|
| a (Å) | 8.4339 | 4.3966 | 2.8709 |
| u (Å) | 0.2616 | — | — |
| V (Å³) | 599.92 | 84.985 | 23.662 |

Notably, the cell parameter of this spinel phase is shifted towards the cell parameter of $MnCr_2O_4$, as highlighted in FIG. 2(e), suggesting that the remaining spinel phase after Fe segregation and redox reorganisation is compositionally similar to (reduced) $MnCr_2O_4$. The same behaviour was observed for compositions belonging to the $MnFe_{1-x}Ni_xCrO_4$ series, for which the spinel cell parameter also converged towards $MnCr_2O_4$ following reorganisation (FIG. 2(e)). This implies that the following general reaction may be written for the reduction process:

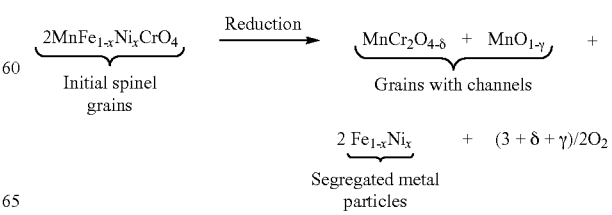

For Mg-containing compounds such as $MgFeCrO_4$, it seems that $MgCr_2O_4$ is the resultant host lattice (i.e. the residual spinel lattice) after reduction. Thus, in one embodiment, the method of the invention produces a catalyst comprising a porous spinel phase supporting metal particles wherein the spinel phase is a spinel of formula $ACr_2O_4$, where A is Mn or Mg.

FIG. 2(f) illustrates the microstructure of a $MnFe_{1-x}Ni_xCrO_4$ (x=0.3) sample after restructuring (i.e. the catalyst of Example 5) and etching of the metal phase in concentrated $HNO_3$. In this form several key characteristics of this sample are highlighted, including the preservation of the overall initial grain morphology, the presence of the fine channels, and notably the fact that the segregated metal particles are embedded in the parent oxide matrix. This is expected to anchor the metal particles in the oxide with potential benefits in terms of particle thermal stability and anti-agglomeration effects, but also may give rise to unique functionality at the metal-oxide interface.

Figure 4:
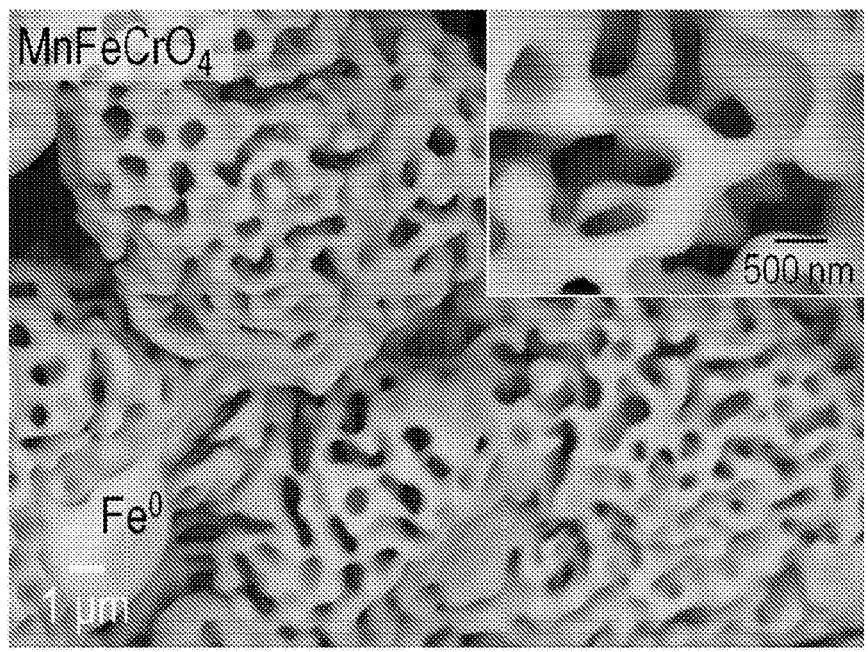
FIG. 4(a) is an SEM image of the catalyst of Example 2.
FIGS. 4(b) and (c) are SEM images of the catalysts of Examples 6 and 7, respectively.
Figure 4:
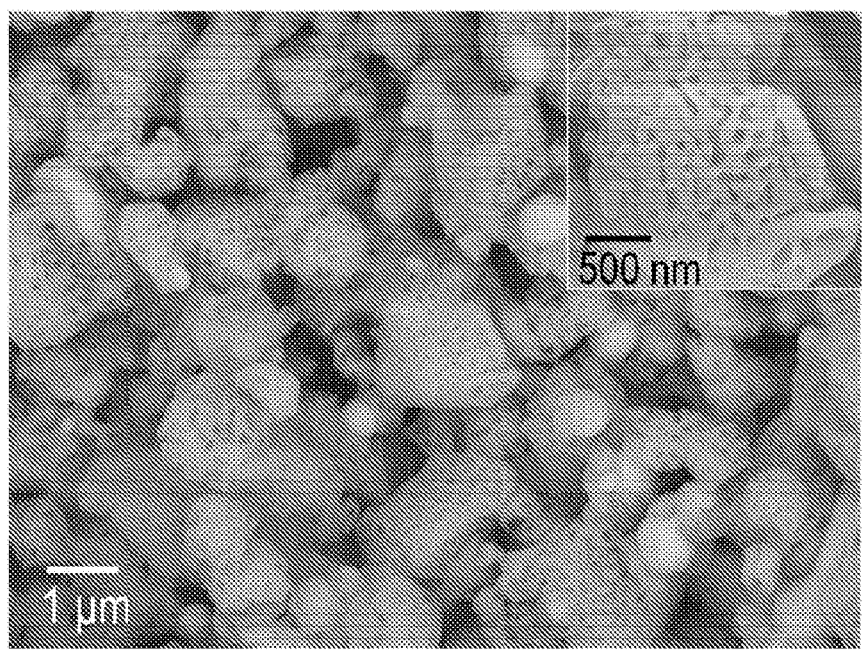
Figure 4:
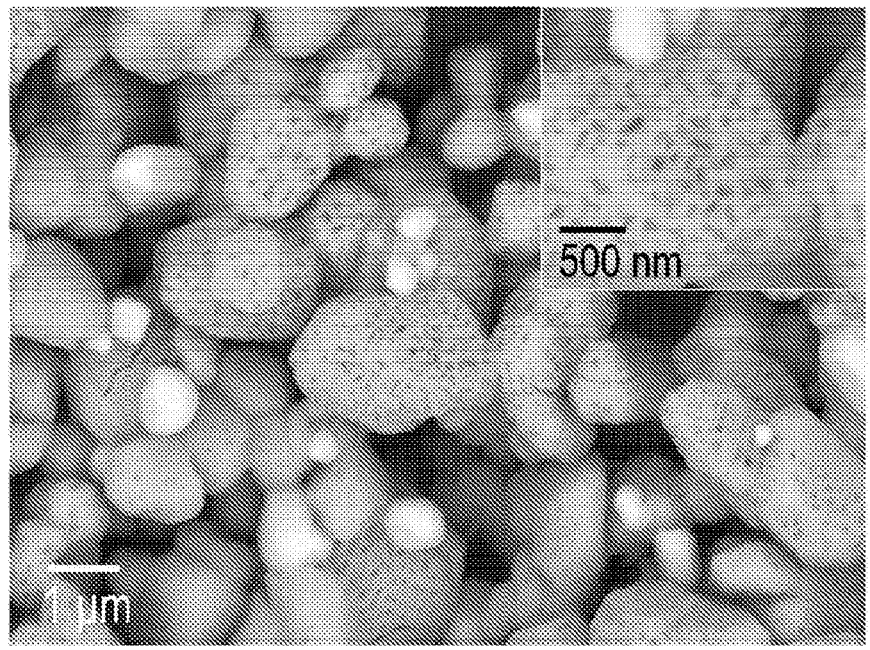
Figure 5:
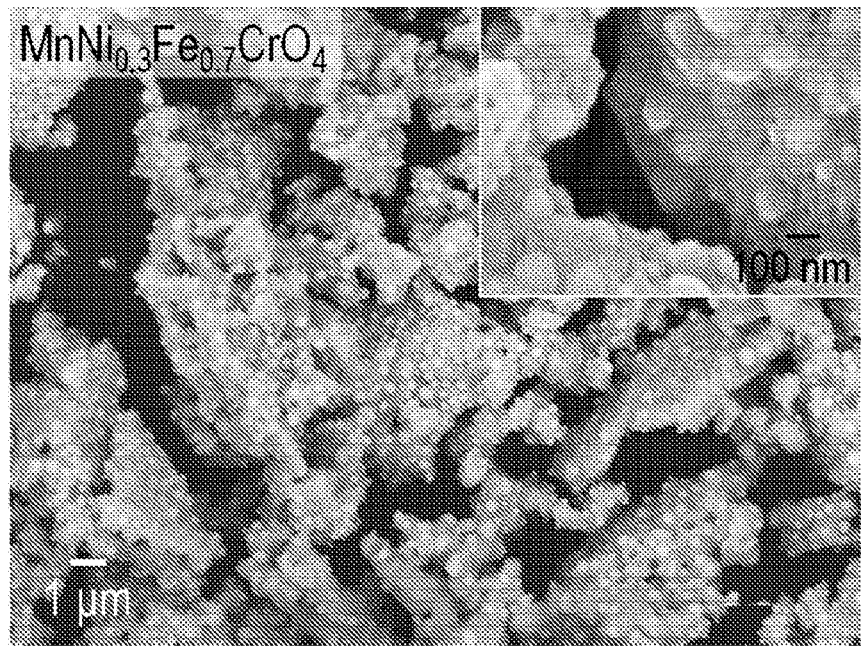
FIG. 5(a) is an SEM image of the catalyst of Example 5.
FIGS. 5(b) and (c) are SEM images of the catalysts of Examples 8 and 9, respectively.
Figure 5:
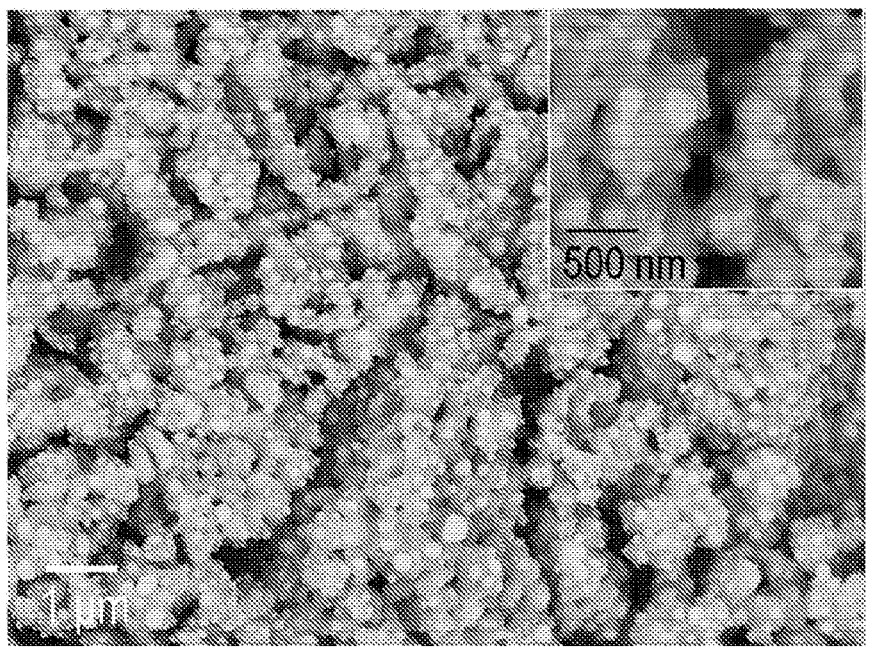
Figure 5:
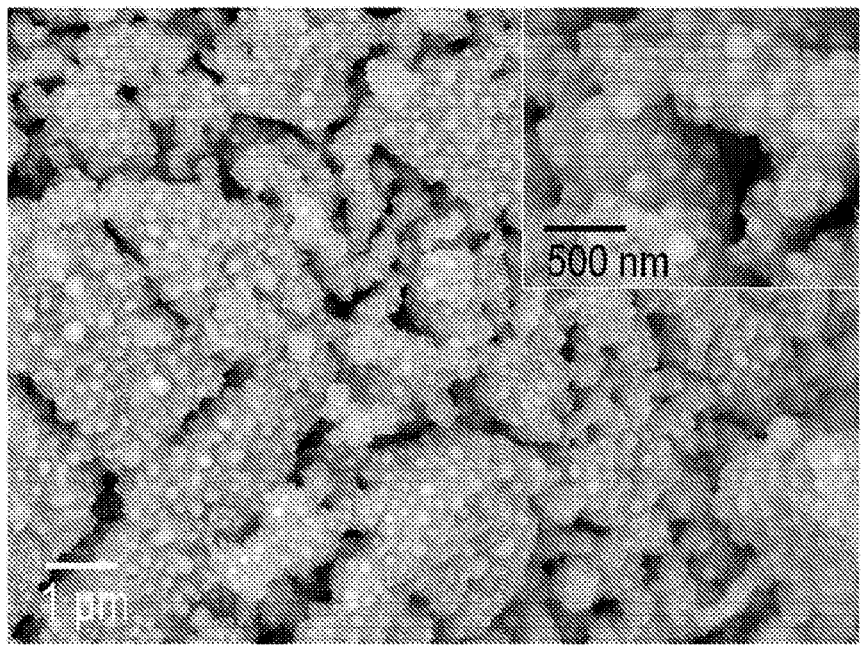

A noteworthy aspect of the reorganisation of the precursor spinel is that it can be controlled by adjusting the reduction conditions and in particular the reduction temperature, enabling one to tailor microstructures in the macro/mesoporous range. As reduction temperature was decreased to 900° C., the size of the channels in $MnFeCrO_4$ decreased below tens of nanometers and their frequency and complexity increased (compare FIG. 4(a) to FIGS. 4(b) and (c)). In the case of $MnNi_{0.3}Fe_{0.7}CrO_4$ the metal particle size decreased below 100 nm and the population of both particles and channels increased as reduction temperature was lowered towards 900° C. (compare FIG. 5(a) to FIGS. 5(b) and (c)). A similar effect was observed for $MnNi_{0.5}Fe_{0.5}CrO_4$. Thus, the number and size of metal particles and pores can be controlled by varying the reduction conditions. For example, generally reducing the reduction temperature will decrease the size of the metal particles and pores, but increase their number. The number and size of metal particles and pores can also be controlled by varying the composition of the precursor spinel. For example, changing the A cation from Mn to Mg can result in smaller but more numerous metal particles.

In one embodiment, the method of the invention produces a catalyst which comprises a porous spinel phase supporting metal particles of Ni, Fe, and/or of mixtures and/or alloys thereof wherein the spinel phase makes up the majority of the catalyst volume, typically greater than 50 vol %, preferably greater than 60 vol % and up to 70 vol % of the catalyst volume as measured using Rietveld refinement. The metal particles typically make up from 1 to ~14 vol % of the catalyst volume as measured using Rietveld refinement. The catalyst can also comprise up to about 30 vol % of oxides of A, for example, MnO, as measured using Rietveld refinement.

In a second aspect, the invention provides a catalyst obtained or obtainable by the method of the first aspect of the invention. The catalyst is as described for the first aspect of the invention.

The catalysts produced by the method of the invention may be further treated so that they comprise additional catalytic metals, or additional catalytic metal compounds or promoters, by means known in the art such as impregnation.

The catalyst of the invention is suitable for use in the steam reforming of hydrocarbons or oxygenated hydrocarbons. In particular, when used in glycerol steam reforming, catalysts prepared by the method of the invention have been found to exhibit improved coking resistance, catalytic activity and conversion when compared to a $Ni/\gamma$-alumina catalyst. Thus in a third aspect, the invention provides a method of steam reforming hydrocarbons or oxygenated hydrocarbons using the catalyst of the invention. The method comprises contacting the hydrocarbon or oxygenated hydrocarbon with steam and the catalyst of the invention under steam reforming conditions. In one embodiment, the method of the invention is a method of producing hydrogen from a hydrocarbon or an oxygenated hydrocarbon by contacting the hydrocarbon or oxygenated hydrocarbon with steam and the catalyst of the invention under steam reforming conditions.

In the third aspect of the invention, the catalyst is as defined for the first and second aspects of the invention. In one preferred embodiment of the third aspect of the invention, the catalyst is obtained from a precursor spinel of formula of $ANi_xFe_{(1-x)}CrO_4$ where A is Mn or Mg and x is from 0 to 0.75, wherein x>0, i.e. both Ni and Fe are present. For example x is 0.1 or greater, or x is 0.2 or greater. In this embodiment, preferably A is Mn.

Steam reforming is a well-known process in which a hydrocarbon feed or feed of a hydrocarbon derivative is contacted with steam in the presence of a catalyst to produce a hydrogen-containing gas. In the steam reforming method of the invention CO and/or $CO_2$ can be formed as well as hydrogen.

Suitable hydrocarbons include methane and other low molecular weight hydrocarbon gases such as natural gas, ethane, propane, butane, LPG (liquefied petroleum gas), naphtha and coke-oven gas. The hydrocarbon gas preferably is 1 to 3, 4 or 7 carbon atoms. Suitable oxygenated hydrocarbons include methanol, ethylene glycol, glycerol, sugars (e.g. glucose and xylose) or sugar alcohols (e.g. sorbitol). The oxygenated hydrocarbon compound preferably has a carbon-to-oxygen ratio of 1:1 and has from 2 to 12 carbon atoms, preferably 2 to 6 or less than 6 carbon atoms. Particularly preferred oxygenated hydrocarbons include methanol, ethanediol, ethanedione, glycerol, glyceraldehyde aldotetroses, aldopentoses, aldohexoses, ketoketroses, ketopentoses, ketohexoses and alditols. From among the oxygenated hydrocarbons having 6 carbon atoms, glucose, sucrose and sorbital are preferred. Ethanediol, glycerol, and glyceraldehyde are the preferred oxygenated hydrocarbons from among those having less than 6 carbon atoms.

Steam reforming with the catalyst if the invention can be carried out in any suitable steam reforming manner. Suitable steam reforming conditions include carrying out the steam reforming reaction at a temperature ranging from about 600 to about 950° C., preferably at a temperature from about 700 to about 900° C., at a pressure ranging from about atmospheric pressure to about 40 bar, preferably at atmospheric pressure, at a moles of steam to moles of hydrocarbon or oxygenated hydrocarbon feedstock in the feed ratio ranging from about 1:1 to 1:10. A mixture of steam and hydrocarbon or oxygenated hydrocarbon feedstock to be reformed is vaporised, conveyed into a reactor where it is brought into contact with the catalyst and the steam reforming reaction occurs. The reactor is typically a fixed bed reactor though other reactors such as a fluidised bed reactor can be used. The desired gaseous product, for example, hydrogen, of the steam reforming process can be purified.

The following examples provide illustrations of the disclosed technology. The examples are non-exhaustive and are not intended to limit the scope of the disclosed technology.
Preparation of Catalysts (i) Preparation of precursor spinel also referred to herein as the "as-prepared spinels" Spinels of $MnFeCrO_4$, $MgFeCrO_4$, $MnNi_{0.3}Fe_{0.7}CrO_4$, $MnNi_{0.5}Fe_{0.5}CrO_4$ were prepared by citric acid-nitrate combustion synthesis (in air). Stoichiometric amounts of $Mn(NO_3)_2 \cdot 4H_2O$ Alfa Aesar (99.98%), $Cr(NO_3)_3 \cdot 9H_2O$ Acros Organics (99%), $Fe(NO_3)_3 \cdot 9H_2O$ Sigma Aldrich (98%), $Mg(NO_3)_2 \cdot 6H_2O$ Sigma Aldrich (99%) and/or $Ni(NO_3)_2 \cdot 6H_2O$ Sigma Aldrich (99%) were dissolved in distilled water along with citric acid ($C_6H_8O_7$) Alfa Aesar (99.5%) and the solutions were continually stirred and heated to 300° C. An excess of 50% citric acid was added for the certainty of a complete reaction. After the reaction was complete the obtained powders were calcined. The $MnFeCrO_4$ and $MgFeCrO_4$ powders were calcined for 10 hours at 1000° C. The $MnNi_{0.3}Fe_{0.7}CrO_4$ and $MnNi_{0.5}Fe_{0.5}CrO_4$ powders were calcined for 10 hours at 700° C. Pellets of 13 mm in diameter and 2±0.3 mm thickness were pressed at a pressure of ~200 MPa from the powder of each spinel and the pellets were then sintered. The pellets of the $MnFeCrO_4$ and $MgFeCrO_4$ spinels were sintered with pore-former (graphite flakes, Alfa Aesar®) at 1400° C. for 12 hours in air, and relative densities of 50% and 60%, respectively, were obtained. The pellets of the $MnNi_{0.3}Fe_{0.7}CrO_4$ and $MnNi_{0.5}Fe_{0.5}CrO_4$ spinels were sintered without pore-former at 1400° C. for 12 hours in air, and resulted in denser ceramic bodies, each having a relative density of ~80-85%. Thus a second series of pellets of $MnNi_{0.3}Fe_{0.7}CrO_4$ and $MnNi_{0.5}Fe_{0.5}CrO_4$ were sintered without pore-former at 1000° C. for 12 hours in air, to obtain a finer microstructure and prevent grain growth. The resultant of $MnNi_{0.3}Fe_{0.7}CrO_4$ and $MnNi_{0.5}Fe_{0.5}CrO_4$ pellets had a relative density of ~55-60%.

(ii) Reduction of the Precursor Spinel

The pellets of as-prepared spinels (or fragments of these) were reduced to cause exsolution of the catalytic metal. Reduction was carried out in one of two different set ups: in a TORVAC vacuum furnace or in a controlled atmosphere furnace with flowing pure $H_2$. The TORVAC furnace employs tungsten elements for heating and generating a strongly reducing environment. The samples are placed on yttria-stabilised zirconia pellets individually supported on carbon paper shelves and stacked in a carbon crucible. The furnace was operated at pressure values of $2\text{-}5 \times 10^{-2}$ mbar ("vacuum") or under 0.1-0.2 bar of 5% $H_2$/Ar to achieve different reducing conditions. Molecular sieves were deployed in the cold zones of the furnace as water traps to help maintain a stable vacuum and ensure a low pressure of $O_2$ is achieved. The controlled atmosphere furnace consists of a Lenton furnace used to heat a dense alumina tube fitted with gas-tight connections at both ends. In this case, the samples are placed in an alumina boat. The set up allows the user to control the flow rates and sect between 5% $H_2$/Ar or pure $H_2$. For safety, heating and cooling up to and down from 650° C. is always performed in 5% $H_2$/Ar.

The following catalyst examples and reference examples were preparation using the conditions detailed in the table below.

|  | Precursor spinel | Reduction conditions |
|---|---|---|
| Ex. 1 | $MnFeCrO_4$ (sintered in air at 1400° C. for 12 hours) | 1200° C. for 0.5 hours under vacuum followed by quenching |
| Ex. 2 | $MnFeCrO_4$ (sintered in air at 1400° C. for 12 hours) | 1200° C. for 1 hour under vacuum |
| Ex. 3 | $MnNi_{0.3}Fe_{0.7}CrO_4$ (sintered at 1000° C. for 12 hours) | 1200° C. for 1.5 hours in 0.2 bar 5% $H_2$/Ar |
| Ex. 4 | $MnNi_{0.5}Fe_{0.5}CrO_4$ (sintered at 1000° C. for 12 hours) | 1200° C. for 1.5 hours in 0.2 bar 5% $H_2$/Ar |
| Ex. 5 | $MnNi_{0.3}Fe_{0.7}CrO_4$ (sintered at 1000° C. for 12 hours) | 900° C. for 2 hours in 0.2 bar 5% $H_2$/Ar. |
| Ex. 6 | $MnFeCrO_4$ (sintered in air at 1400° C. for 12 hours) | 1000° C. for 2.5 hours in 0.2 bar 5% $H_2$/Ar |
| Ex. 7 | $MnFeCrO_4$ (sintered in air at 1400° C. for 12 hours) | 900° C. for 2.5 hours in 0.2 bar 5% $H_2$/Ar |
| Ex. 8 | $MnNi_{0.3}Fe_{0.7}CrO_4$ (sintered at 1000° C. for 12 hours) | 1000° C. for 2.5 hours in 0.2 bar 5% $H_2$/Ar |
| Ex. 9 | $MnNi_{0.3}Fe_{0.7}CrO_4$ (sintered at 1000° C. for 12 hours) | 900° C. for 2.5 hours in 0.2 bar 5% $H_2$/Ar |
| Ex. 10 | Catalyst of Example 2 crushed using a mortar and pestle, resulting in a powder with a specific surface area of 1.65 $m^2$/g $MnFeCrO_4$ (I) | |
| Ex. 11 | Catalyst of Example 3 crushed using a mortar and pestle, resulting in a powder with a specific surface area of 1.22 $m^2$/g $MnNi_{0.3}Fe_{0.7}CrO_4$ | |
| Ex. 12 | Catalyst of Example 4 crushed using a mortar and pestle, resulting in a powder with a specific surface area of 1.25 $m^2$/g $MnNi_{0.5}Fe_{0.5}CrO_4$ | |
| Ex. 13 | Catalyst of Example 2 ball milled, resulting in a powder with a specific surface area of 5.34 $m^2$/g $MnFeCrO_4$ (II) | |

A reference example, Reference Example 1, was prepared by subjecting a $MnCr_2O_4$ spinel to sintering in air at 1400° C. for 12 hours, followed by reduction in 5% $H_2$/Ar at 1000° C. for 20 hours. The $MnCr_2O_4$ spinel was prepared using combustion synthesis as described above for the other spinels.

A further reference catalyst, Reference Example 2, 10 wt. % Ni/$\gamma$-$Al_2O_3$ catalyst was prepared by infiltration of an Ni precursor on a high surface area $\gamma$-$Al_2O_3$ (48 $m^2$/g), followed by calcination at 500° C.

X-Ray Diffraction Analysis

X-ray diffraction (XRD) was performed on both catalysts of the invention and as-prepared spinels using a PANalytical Empyrean Diffractometer operated in reflection mode. The patterns were initially compared with the appropriate-ICDD files and eventually analysed in depth by Rietveld method (Fullprof software) in order to extract information regarding the unit cell parameter a, (Å), oxygen coordinate parameters u, (Å), and structural characteristic of other formed phases (multiple phase refinement). Crystallographic information was obtained from National Chemical Database service and also from Crystallography Open Database.

The spinels employed in these examples are $MnFeCrO_4$, $MgFeCrO_4$ and, the Ni-substituted compositions, $MnFe_{1-x}Ni_xCrO_4$, (x=0.3, 0.5). In the precursor state (also referred to herein as the as-prepared or oxidised state) these exhibited a characteristic $Fd\bar{3}m$ (No 227) cubic crystal structure, as found by Rietveld refinement of the corresponding powder X-ray diffraction (XRD) patterns. An example of this analysis follows and the corresponding structure is shown for $MnNi_{0.5}Fe_{0.5}CrO_4$ in FIG. 1.

The spinel phase was refined in the space group $Fd\bar{3}m$ (No 227) with origin at $\bar{3}m$ and the A, B, and O site positions corresponding to 8a (¼, ¼, ¼), 16d (½, ½, ½) and 32e (u, u, u), respectively. In the case of species with very similar X-ray scattering factors such as Fe, Cr Mn and Ni, the inversion degree was not refined because XRD can not accurately discriminate between them and, as such, they were considered to be normal spinels, with Mn at the A site, while Fe, Cr and Ni were considered at the B site. The refinement that reached satisfactory fits were exported as CIF files and imported in Crystal Maker Software for Windows for visualizing the actual crystal structure. In the case of the reduced spinels Rietveld refinement was usually performed with a minimum of three phases (e.g. spinel, MnO and Fe/Ni metals/alloys). The refinement steps employed here are as follows. The spinel phase was refined initially, starting with the background, scale factor, cell parameter, oxygen atomic position and peak profile parameters and the thermal factor. Zero shift was corrected with respect to the Si standard. Later stages of the refinement mostly focusing on refining the scale factors and cell parameters of other phases, while the peak profile parameters were the ones refined for spinel and manually adjusted for a better fitting but not released for refinement. MnO was refined in the space group $Fd\bar{3}m$ (No 225) and atomic positions 4a (0, 0, 0) and 4b (½, ½, ½) for Mn and O, respectively. Fe was refined in the space group $Im\bar{3}m$ (No 229) and atomic position 2a (0, 0, 0), Ni in the space group $Fd\bar{3}m$ (No 225) and atomic position 4a (0, 0, 0) and Fe—Ni alloys were considered in the space group $Fm\bar{3}m$ (No 225) and atomic position 4a (0, 0, 0).

For the series $MnNi_xFe_{1-x}CrO_4$ the spinel unit cell parameter (a) was found to vary linearly with $Ni^{2+}$ substitution (x) up to x=0.5, following Vegard's law and thus implying that $Ni^{2+}$ was successfully solubilised in the $MnFeCrO_4$ lattice. An attempt was made to synthesize the x=1 member of the series, but NiO was observed as secondary phase alongside a majority spinel phase with lattice parameter corresponding to x=0.56 Ni which can probably be regarded as an upper solubility limit.

SEM Analysis

The microstructure of the samples was investigated using a JEOL JSM-6700 field emission scanning electron microscope (FEG-SEM) equipped with secondary and backscattered electron detector. Here backscattering imaging was generally preferred for better contrast between the spinel (light) and metal (heavy) phase. Selected samples were also embedded in resin, cut and polished for better microstructure analysis of the cross section or interfaces.

Surface Area

Specific surface area and pore size distribution were determined by BET analysis measured in a Tristar II (Micromeritics) apparatus. The results are shown in the table below.

| Catalyst | BET surface area ($m^2\ g^{-1}$) |
|---|---|
| Reference Example 2 (10% $Ni/Al_2O_3$) | 48.7781 |
| Example 12 ($MnNi_{0.5}Fe_{0.5}CrO_4$) | 1.2508 |
| Example 11 ($MnNi_{0.3}Fe_{0.7}CrO_4$) | 1.2249 |
| Example 10 ($MnFeCrO_4$) | 1.656 |
| Example 13 ($MnFeCrO_4$ milled) | 5.347 |

Catalytic Test

In order to probe the catalytic potential of these new structures, some of the systems discussed above were tested as catalysts for glycerol steam reforming at 700° C.

Samples with selected microstructures, such as the catalysts of Examples 2, 3 and 4 were crushed in a mortar and pestle, resulting in powders with specific surface area of 1.65 $m^2/g$, 1.22 $m^2/g$ and 1.25 $m^2/g$, respectively. The resulting powders are labelled Examples 10, 11 and 12, respectively. The catalyst of Example 1 was also ball milled, producing a powder with 5.34 $m^2/g$, labelled Example 13. For reference, the 10 wt. % $Ni/\gamma$-$Al_2O_3$ catalyst of Reference Example 3 was prepared.

Steam reforming of pure glycerol was carried out in a fixed bed quartz tube (10 mm OD, 8 mm ID and 24 cm long) 700° C. and atmospheric pressure and later at 800° C. and 900° C. The glycerol/water mixture was supplied using syringe Harvard apparatus 22 infusion pump at the flow rate of 0.019 mL/min to a stainless steel pipe wrapped with heating tape at 250° C. for vaporization. The vaporized reactant mixture was conveyed into the reactor by carrier gas (Helium) at flow rate of 40 mL/min. Steam/Carbon=3 was used and the test was conducted for 2 hours. Gaseous products were analysed using an on-line Gas Chromatograph equipped with TCD (HP 6890 series) and Mass Spectrometer Residual Gas Analyser.

There are several reactions that could occur during steam reforming of glycerol, but only a few deemed most relevant are presented below:

$$C_3H_8O_3(g)+3H_2O(g)\leftrightarrows 3CO_2(g)+7H_2(g) \quad \text{(Equation 1)}$$

which could be written as:

$$C_3H_8O_3(g)\leftrightarrows 3CO(g)+4H_2(g) \quad \text{(Equation 2)}$$

$$CO(g)+H_2O(g)\leftrightarrows CO_2(g)+H_2(g) \quad \text{(Equation 3)}$$

other possible reactions:

$$C_3H_8O_3(g)+5H_2(g)\leftrightarrows 3CH_4(g)+3H_2O(g) \quad \text{(Equation 4)}$$

$$CO(g)+3H_2(g)\leftrightarrows CH_4(g)+H_2O(g) \quad \text{(Equation 5)}$$

$$CO_2(g)+4H_2(g)\leftrightarrows CH_4(g)+2H_2O(g) \quad \text{(Equation 6)}$$

$$CO_2(g)+CH_4(g)\leftrightarrows 2CO(g)+2H_2O(g) \quad \text{(Equation 7)}$$

$$CH_4(g)\leftrightarrows 2H_2(g)+C(s) \quad \text{(Equation 8)}$$

$$C(s)+H_2O(g)\leftrightarrows CO(g)+H_2(g) \quad \text{(Equation 9)}$$

$$2CO(g)\leftrightarrows C(s)+CO_2(g) \quad \text{(Equation 10)}$$

Figure 6:
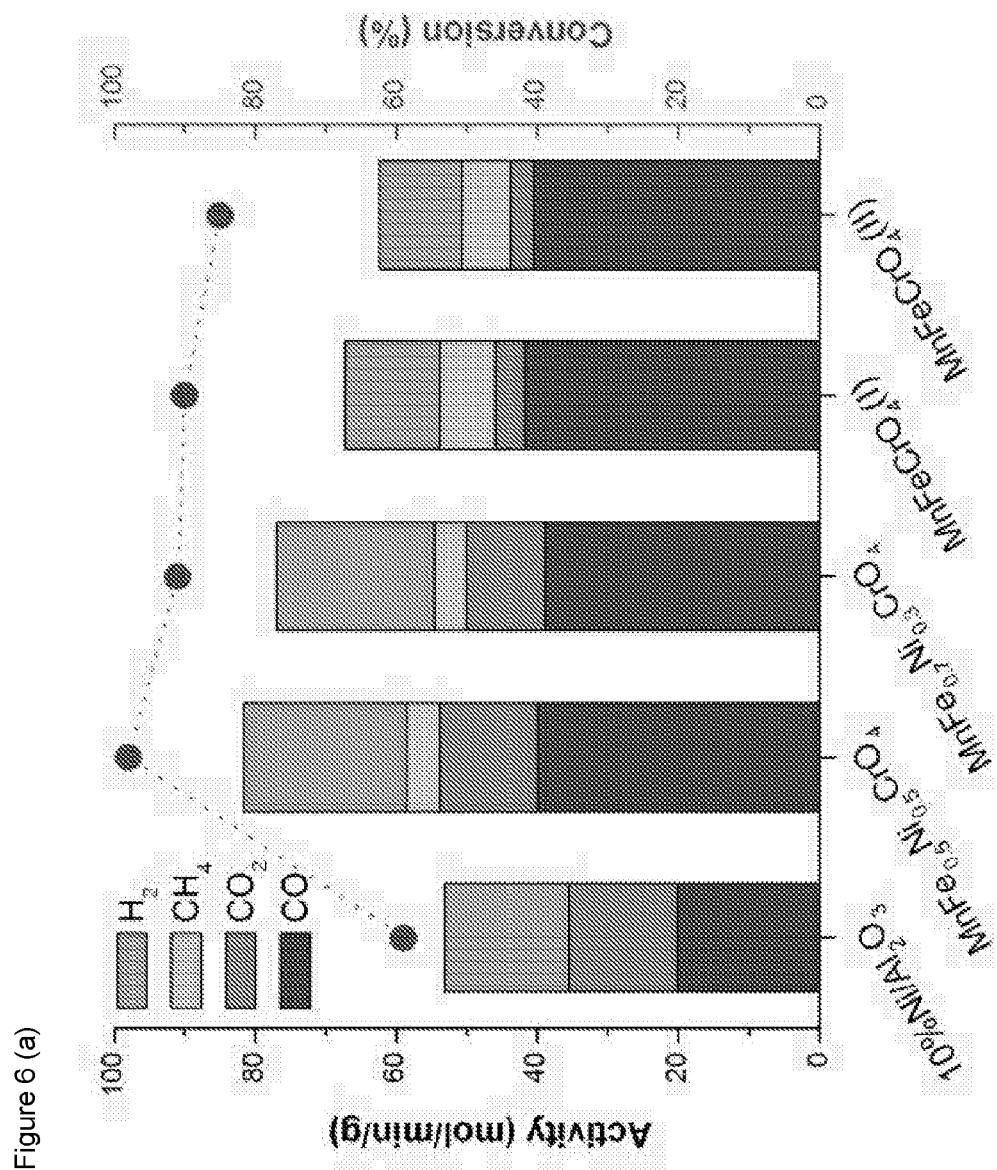
FIG. 6 (a) is a graph of catalytic activity represented by mol/min.g of $H_2$, CO, $CH_4$ and $CO_2$ produced and of the overall conversion (%) in a steam reforming of glycerol reaction when the catalysts of Reference Example 2 (Ni/alumina), Examples 10 to 13 are used.
Figure 6:
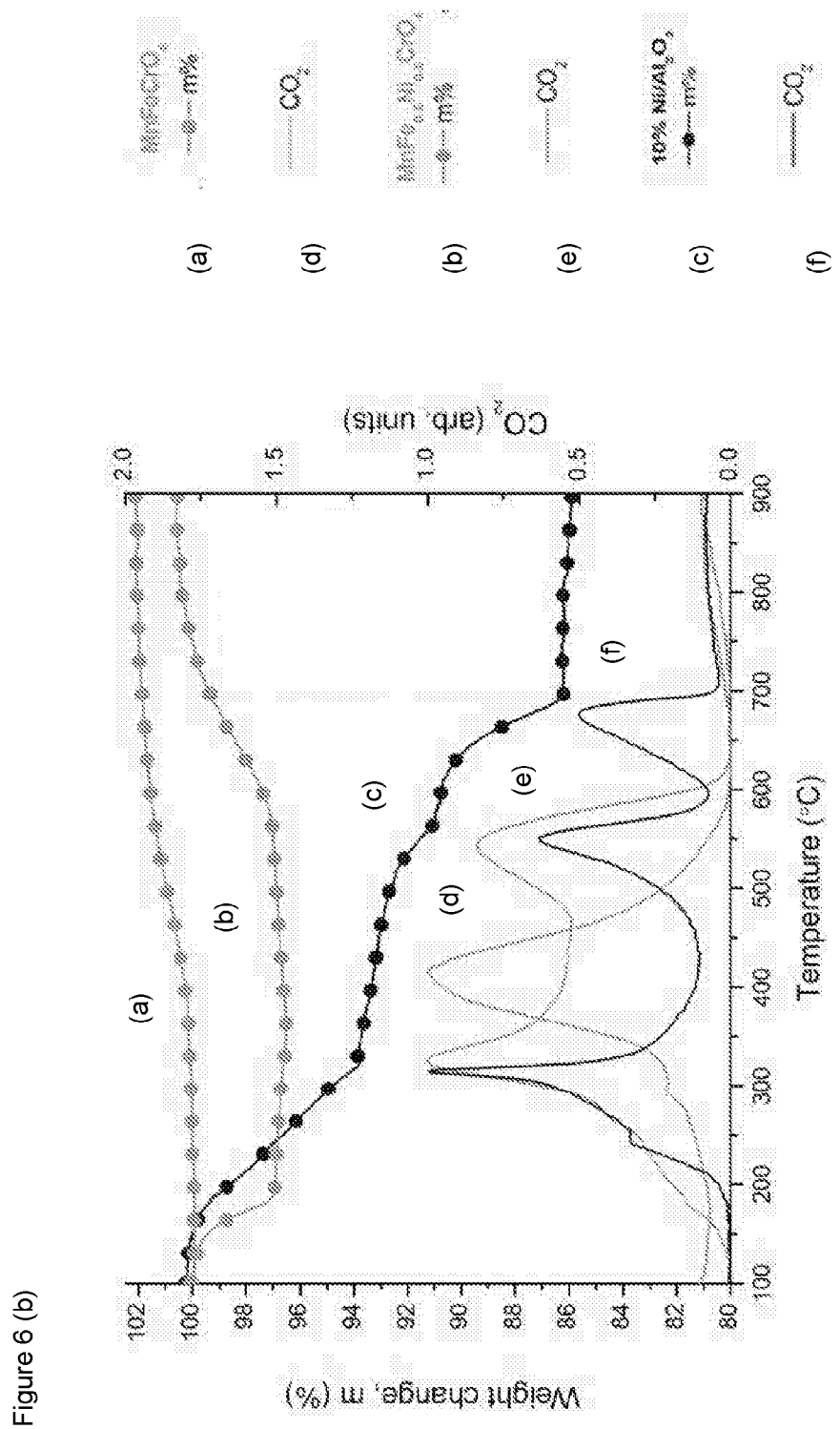

The catalytic activity (expressed as moles of produced gas per minute and gram of catalyst) and the overall conversion (in %) are plotted in FIG. 6(a) for the selected catalysts.

It is clear from this plot that all the restructured spinel catalysts of the invention have superior activity and conversion as compared to the much higher surface area 10 wt. % $Ni/\gamma$-$Al_2O_3$ system. There is a considerable gap in terms of conversion between $MnFe_{0.5}Ni_{0.5}CrO_4$ and 10 wt. % $Ni/\gamma$-$Al_2O_3$ given that the former achieves almost complete conversion, 98%, while the latter only 59%. Notably, the activity towards $H_2$ production increases as the compositional system are richer in Ni, but CO production activity seems to be considerably high regardless of system, indicating good reforming activity. Fe-containing spinel catalysts seem to promote conversion to methane, probably through Equation 6 because the methane fraction seems to increase at the expense of the $CO_2$ fraction when going from Ni rich to Fe based spinel catalysts.

By increasing the surface area through milling (e.g. catalysts of Examples 12 and 13) it was observed that the activity or conversion did not change significantly. This is probably because the activity depends on the macroporous structure of the catalyst, the metal particles surface or interface with the oxide which were not increased by milling since the initial particle size was too small to be further milled in the milling conditions used here. Higher activities should be expected however, when microstructures with smaller particle size and higher population (e.g. FIGS. 4(c) and 5(c)) are used.

Another critical aspect of catalyst viability in glycerol steam reforming is the resistance towards carbon deposition which was investigated here by subjecting the powders used in testing to temperature-programmed oxidation (TPO). In this experiment, the samples were exposed to oxidising conditions and their weight change was monitored in parallel with the released $CO_2$ as a function of temperature. Thus, observing weight loss in TPO indicates that carbon was deposited during the steam reforming of glycerol and is being removed through oxidation to $CO_2$. Weight gain is indicative of sample oxidation (most likely metal particle oxidation).

In TPO, 10 wt. % Ni/γ-$Al_2O_3$ shows considerable weight loss (~14%) across the investigated temperature range, indicative of significant carbon deposition (FIG. 6(b)). The weight loss profile is closely reflected by the $CO_2$ release profile, both indicating that there are three main temperature regions where carbon is being removed for this sample. This suggests three types of carbon with increasingly higher resilience towards oxidation are present at the metal centres (~300° C.), the metal-oxide interface (~550° C.) and on the support (~675° C.). Obviously, the 10 wt. % Ni/γ-$Al_2O_3$ catalyst contained significant quantities of each of these carbon types, which probably explains the lower activity and conversion observed for this catalyst.

By contrast, the reorganised spinel $MnNi_{0.5}Fe_{0.5}CrO_4$ which displayed the highest activity and 98% conversion only shows two low temperature carbon peaks. In fact, only the lower temperature peak (300° C.) has a noticeable weight loss component associated to it (~3%), although this is still half of the analogue quantity for 10 wt. % Ni/γ-$Al_2O_3$ (see FIG. 6(b)). This suggests that even if limited coking does occur on these catalysts, it can be easily removed through a mild oxidation at ~300° C.

Interestingly, the Fe-only catalysts system, $MnFeCrO_4$ displayed no weight loss, indicative of very limited carbon deposition, suggesting Fe-based catalysts may be considerable more resilient to coking during glycerol steam reforming. This may indicate that the limited coking observed in the high-performing $MnNi_{0.5}Fe_{0.5}CrO_4$ could also relate to the fact that most of the particles in this system are (Fe,Ni) alloys rather than pure Ni metal. Thus, the in situ alloying achieved through restructuring method of the invention may serve to tailor these systems and improve their general stability and performance.

The invention claimed is:

1. A method for preparing a catalyst comprising heating a spinel of formula $ANi_xFe_{(1-x)}CrO_4$ where A is Mn or Mg and x is from >0 to 0.75 under reducing conditions at a temperature of from 800 to 1500° C. so as to cause a restructuring of the spinel to form a catalyst comprising a porous spinel phase supporting metal particles of Ni, Fe, mixtures thereof and/or alloys thereof; wherein the porous spinel phase has the formula $ANi_xFe_{(1-x)}CrO_4$ where A is Mn or Mg and x is 0 to 0.75 or $ACr_2O_4$, where A is Mn or Mg.

2. The method according to claim 1, wherein the spinel of formula $ANi_xFe_{(1-x)}CrO_4$ is single phase.

3. The method according to claim 1, wherein when A is Mn, x is less than or equal to 0.55.

4. The method according to claim 1, wherein the metal particles have a particle size of 10 nm to 5 μm.

5. A catalyst prepared by the method of claim 1.

6. A method of steam reforming a hydrocarbon or an oxygenated hydrocarbon comprising contacting said hydrocarbon or oxygenated hydrocarbon with steam and the catalyst according to claim 5.

7. A method according to claim 6, wherein said oxygenated hydrocarbon is steam reformed.

8. A method according to claim 6, wherein said oxygenated hydrocarbon is glycerol.

* * * * *